(12) United States Patent
Quenerch'Du et al.

(10) Patent No.: US 10,196,135 B2
(45) Date of Patent: Feb. 5, 2019

(54) DEVICE AIRCRAFT UNDERCARRIAGE LEG INCLUDING RACK-AND-PINION TYPE MEANS FOR CONTROLLING THE ORIENTATION OF THE WHEELS OF THE UNDERCARRIAGE LEG

(71) Applicant: SAFRAN LANDING SYSTEMS, Velizy-Villacoublay (FR)

(72) Inventors: Marc Quenerch'Du, Velizy-Villacoublay (FR); Bertrand Euzet, Velizy-Villacoublay (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 351 days.

(21) Appl. No.: 15/231,921

(22) Filed: Aug. 9, 2016

(65) Prior Publication Data

US 2017/0043865 A1 Feb. 16, 2017

(30) Foreign Application Priority Data

Aug. 10, 2015 (FR) ...................... 15 57648

(51) Int. Cl.
*B64C 25/50* (2006.01)
*F16H 55/28* (2006.01)
(Continued)

(52) U.S. Cl.
CPC .............. *B64C 25/50* (2013.01); *B64C 25/34* (2013.01); *F16H 19/04* (2013.01);
(Continued)

(58) Field of Classification Search
CPC ......... B64C 25/50; B64C 25/34; F16H 19/04; F16H 25/2204; F16H 55/285; F16H 2025/2075
See application file for complete search history.

(56) References Cited

U.S. PATENT DOCUMENTS

| | | | | |
|---|---|---|---|---|
| 3,498,153 A | * | 3/1970 | Wagner | ................. B62D 3/08 74/424.86 |
| 4,043,607 A | * | 8/1977 | Signorelli | ............ B60T 8/1703 188/181 T |

(Continued)

FOREIGN PATENT DOCUMENTS

| | | |
|---|---|---|
| EP | 2 527 689 A2 | 11/2012 |
| EP | 2 620 673 A1 | 7/2013 |

*Primary Examiner* — Justin M Benedik
(74) *Attorney, Agent, or Firm* — Sughrue Mion, PLLC

(57) ABSTRACT

An aircraft undercarriage leg having an orientation control for wheels that causes a sliding rod to pivot. The orientation control has a rotating member mounted on the strut assembly having a toothed sector forming a pinion and is rotationally coupled to the sliding rod, and a rack mounted to slide on the strut assembly along a sliding axis perpendicular to the pivot axis to mesh with the pinion, the rack being moved by drive means. The drive include a rotary drive inside the rack adapted to turn about the sliding axis and to cooperate via a helicoidal coupling with the rack, The rotary drive is immobilized axially by two opposite axial thrust bearings allowing angular tilting of the rotary drive. The thrust bearings are carried by at least one elongate support inside the rack having a proximal end fixed to an end of a cylinder in which the rack slides.

10 Claims, 2 Drawing Sheets

(51) Int. Cl.
*B64C 25/34* (2006.01)
*F16H 19/04* (2006.01)
*F16H 25/22* (2006.01)
*F16H 25/20* (2006.01)

(52) U.S. Cl.
CPC ....... *F16H 25/2204* (2013.01); *F16H 55/285* (2013.01); *F16H 2025/2075* (2013.01)

(56) References Cited

U.S. PATENT DOCUMENTS

| | | | | |
|---|---|---|---|---|
| 5,722,777 | A * | 3/1998 | Ouchi | G01P 3/443 384/446 |
| 7,538,545 | B2 * | 5/2009 | Koike | G01P 3/443 324/207.25 |
| 8,327,697 | B2 * | 12/2012 | McCann | B60T 8/171 73/115.07 |
| 8,567,245 | B2 * | 10/2013 | Tezuka | G01P 3/443 73/494 |
| 9,127,718 | B2 * | 9/2015 | Barcat | G01D 5/24433 |
| 2002/0030482 | A1 * | 3/2002 | Iwamoto | G01P 3/443 324/174 |
| 2003/0020326 | A1 * | 1/2003 | Salamat | B60T 8/1703 303/112 |
| 2006/0186267 | A1 * | 8/2006 | Steiner | B60T 8/1703 244/110 A |
| 2007/0006650 | A1 * | 1/2007 | Pradier | B64C 25/36 73/488 |
| 2008/0179146 | A1 * | 7/2008 | Sullivan | B60L 7/26 188/164 |
| 2009/0261197 | A1 * | 10/2009 | Cox | B64C 25/36 244/50 |
| 2012/0104158 | A1 * | 5/2012 | Charles | B64C 25/405 244/50 |
| 2012/0104159 | A1 * | 5/2012 | Charles | B64C 25/405 244/50 |
| 2013/0091969 | A1 * | 4/2013 | Bucheton | B64C 25/405 74/405 |
| 2013/0146707 | A1 * | 6/2013 | Lynas | B64C 25/22 244/110 A |
| 2015/0253773 | A1 * | 9/2015 | Cox | G05D 1/0083 701/3 |
| 2016/0221669 | A1 * | 8/2016 | Didey | B64C 25/405 |

\* cited by examiner

DEVICE AIRCRAFT UNDERCARRIAGE LEG INCLUDING RACK-AND-PINION TYPE MEANS FOR CONTROLLING THE ORIENTATION OF THE WHEELS OF THE UNDERCARRIAGE LEG

The invention relates to an aircraft undercarriage leg including rack-and-pinion type means for controlling the orientation of the wheels of the undercarriage leg.

TECHNOLOGICAL BACKGROUND OF THE INVENTION

There are known aircraft undercarriage legs including a strut assembly articulated to the structure of the aircraft and receiving a sliding rod equipped in its lower portion with an axle that carries the wheels of the undercarriage leg. Some undercarriage legs include an orientation control for orienting the wheels of the undercarriage leg. These orientation controls include a member mounted to turn on the strut assembly (such as a collar, or a rotating tube) that is connected to the sliding rod by a torque link allowing free sliding of the rod but constraining the sliding rod to rotate with the rotating member. The angular position of the latter relative to the strut assembly is determined by an orientation actuator.

On some aircraft, such as the Airbus A320 for example, the orientation actuator includes a rack that is mounted to slide in cylinders on either side of the strut assembly and meshes with a toothed portion of the rotating member forming a pinion. The rack may be moved hydraulically, as on the A320, or by means of a linear electromechanical actuator as proposed in the documents EP 2 620 673 and EP 2 527 689.

These orientation controls are subject to high deformations at the level of the meshing engagement between the pinion and the rack, which makes the use of a recirculating ball screw type transmission difficult, given the stiffness of this kind of actuation.

OBJECT OF THE INVENTION

The invention aims to propose an undercarriage leg including a rack-type orientation control compatible with a rigid transmission of the recirculating ball screw type.

STATEMENT OF THE INVENTION

In order to achieve the above aim, there is proposed an undercarriage leg including a strut assembly in which a rod carrying in its lower portion one or more wheels is mounted to slide and free to turn about a pivot axis, the undercarriage leg including an orientation control for selectively orienting the wheel or wheels by causing the sliding rod to pivot, the orientation control including a rotating member rotatably mounted on the strut assembly that includes a toothed sector forming a pinion and is rotationally coupled to the sliding rod, as well as a rack mounted to slide on the strut assembly along a sliding axis perpendicular to the pivot axis to mesh with the pinion, the rack being moved by drive means including a motor. In accordance with the invention, the drive means include a rotary drive inside the rack adapted to turn about the sliding axis and to cooperate via a helicoidal coupling with the rack, the rotary drive being immobilized axially by two opposite axial thrust bearings allowing angular tilting of the rotary drive, the thrust bearings being carried by at least one elongate support inside the rack having a proximal end fixed to an end of a cylinder in which the rack slides.

The rotary drive is therefore free to tilt angularly and is therefore able to follow angular deformations of the rack. Moreover, thanks to the flexibility in bending of the elongate support, the rotary drive is also able to follow transverse movements of the rack. Also, when the axial thrust bearings comprise thrust bearings with rolling elements (needles, rollers) they are free to slide relative to the bearing plane of the rolling elements, which enables the drive to follow the rack even better.

It then remains to drive the rotation of the rotary drive by the transmission of a rotary movement from a motor by means of a transmission adapted to follow the movements of the rotary drive, for example by means of a long flexible shaft with a convex spline drive.

The relative position between the tube of the rack and the rotary drive is therefore relatively unconstrained and thus becomes compatible with a rigid helicoidal connection of the recirculating ball screw type.

In accordance with one particular aspect of the invention, the connection between the rack and the rotary drive is of the helicoidal recirculating ball screw type and includes two sets of balls separated at the level of a central part of the rotary drive. In fact, this central part corresponds to the area meshing with the rack and is therefore highly stressed. The fact of not causing the balls to circulate in this area prevents overstressing of the ball races caused by the meshing deformations.

In accordance with another particular aspect of the invention, the connection between the rack and the rotary drive is of the helicoidal recirculating ball screw type, the rack including a ball race that is deepened at the level of a portion of the ball race facing the meshing area. This deepening makes it possible to provide clearance in the ball race to absorb the meshing deformations and therefore to avoid excessive stressing of the balls present in the deepened portion of the race.

DESCRIPTION OF THE FIGURES

The invention will be better understood in the light of the following detailed description with reference to the figures of the appended drawings, in which.

DETAILED DESCRIPTION OF PARTICULAR EMBODIMENTS OF THE INVENTION

Figure 1:
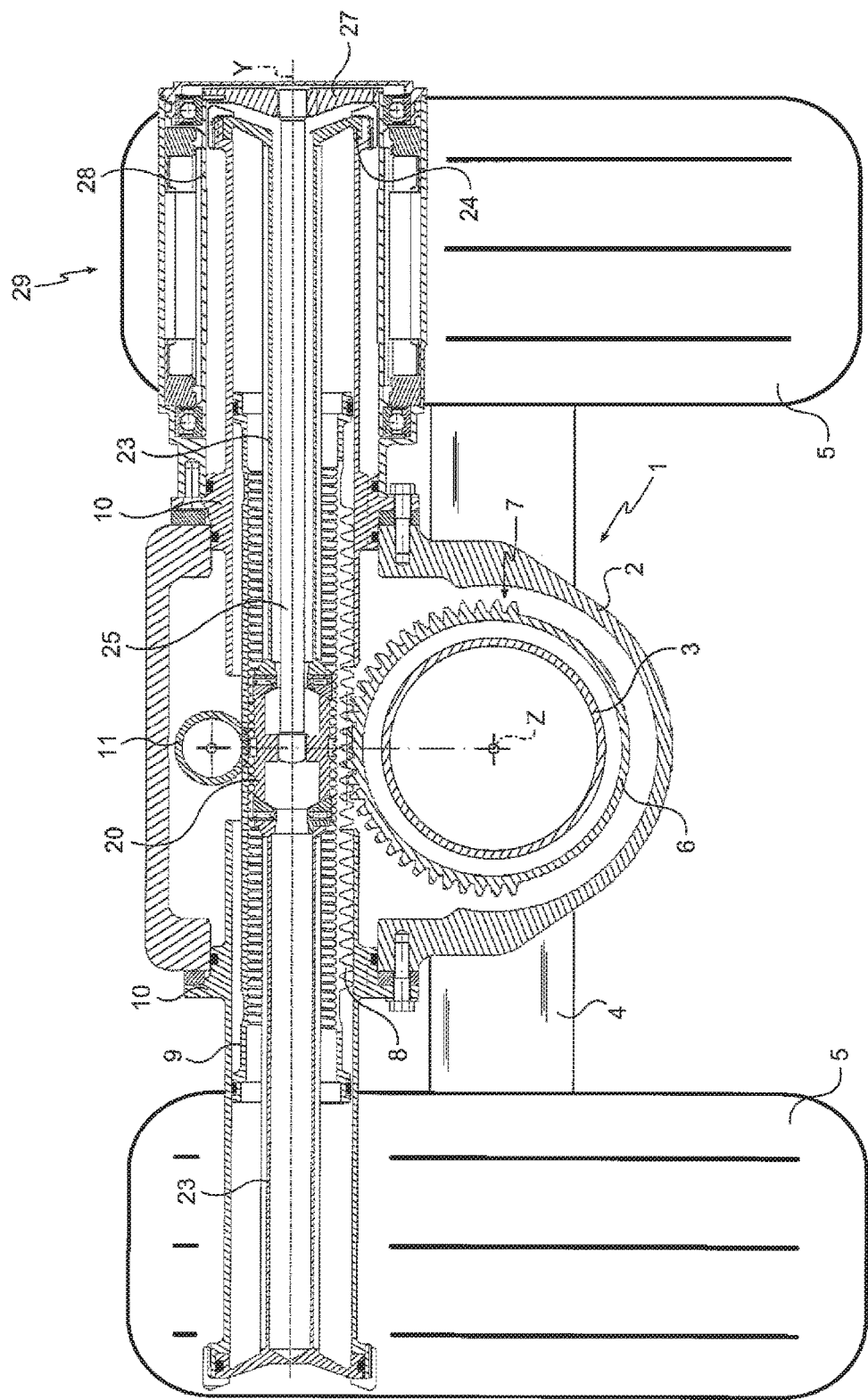
FIG. 1 is a view in section of an undercarriage leg in accordance with the invention on a plane passing through the sliding axis of the rack.

The invention applies to an aircraft undercarriage leg 1 the strut assembly 2 of which is seen here in section. A sliding rod 3 is mounted to slide inside the strut assembly 2 along a longitudinal axis Z (here seen end on). The sliding rod 3 carries at its lower end an axle 4 that here carries two wheels 5. The sliding rod 3 is free to pivot about the axis Z (which is therefore also a pivot axis of the sliding rod). The undercarriage leg includes an orientation control for controlling the pivoting of the sliding rod 3 and therefore the orientation of the wheels 5.

The orientation control includes a rotating tube rotatably mounted in the strut assembly 2 that is coaxial with the sliding rod 3 and connected to it by a torque link (not shown) that constrains the rotating tube 6 to rotate with the sliding rod 3 at the same time as allowing free sliding of the sliding rod 3. The rotating tube 6 includes a toothed sector forming a pinion 7. The pinion 7 meshes with a rack 8 carried by a tube 9 mounted to slide along a sliding axis Y perpendicular to the axis Z in a transverse cylinder consisting here of two half-cylinders 10 bolted to the strut assembly 2. A reaction roller 11 is rotatably mounted on the strut assembly 2 opposite the meshing area to counter the tendency of the meshing forces to bend the rack tube 9.

The interior of the rack tube 9 is conformed as a helicoidal ball race to cooperate with balls carried by a rotary drive 20 inside the rack tube 9 (which then forms a nut). Here, the recirculation of the balls on the rotary drive is organized as a thread-by-thread recirculation, for example.

The rotary drive is retained axially in position by two opposite ball-joint type axial thrust bearings 21 that cooperate with the rotary drive 20 via spherical surfaces. The axial thrust bearings 21 are supported by needle roller thrust bearings 22 at the distal end of elongate supports 23 on either side of the rotary drive 20 inside the rack tube 9. The proximal ends 24 of the elongate supports 23 are fixed to the ends of the half-cylinders 10.

The rotary drive 20 is therefore axially positioned so that its central part is in the area in which the rack tube 9 meshes with the pinion 7. The spherical bearing surfaces of the axial thrust bearings allow angular tilting of the rotary drive 20. The flexibility in bending of the elongate supports 23 allows transverse movement of the rotary drive 20 which, combined with the possibility of the needle roller thrust bearings sliding on their respective rolling planes, enables the rotary drive 20 to follow the movements and deformations of the rack tube 9 without excessive stresses.

Here the rotary drive 20 is driven in rotation by means of a shaft 25 the distal end 26 of which includes convex splines engaged in a splined orifice in a central wall of the rotary drive 20. The shaft 25 is inside one of the elongate supports 23 and has a proximal end 27 fastened to the rotor 28 of an electric motor 29 extending around one of the half-cylinders 10. Upon movement of the rotary drive 20 the flexibility in bending of the shaft 25 and the ball-joint type connection provided by the convex splines transmit torque from the motor to the rotary drive without generating excess stresses.

Figure 2:
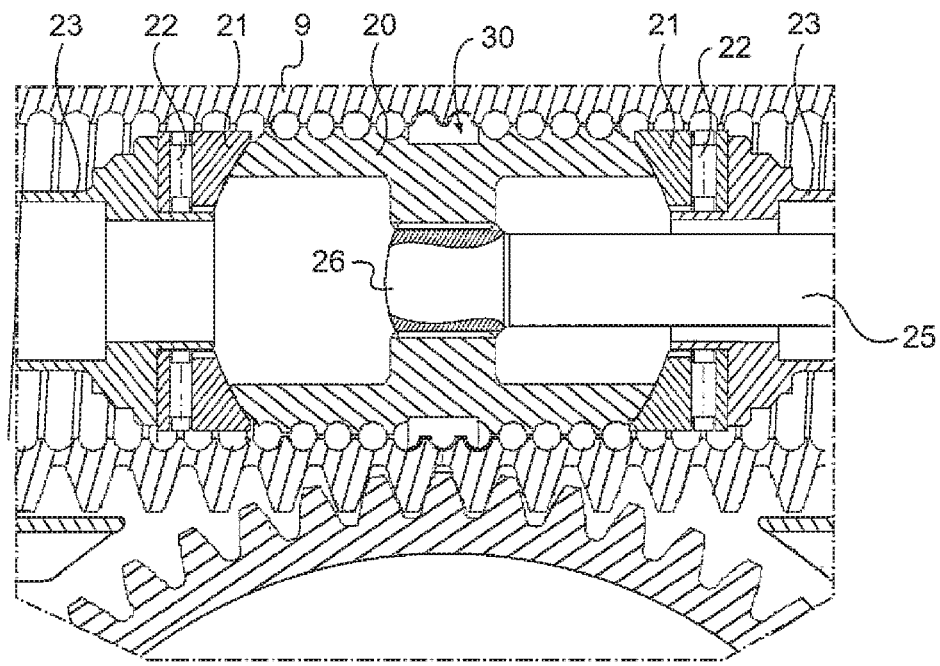
FIG. 2 is a view of a detail of the undercarriage leg from FIG. 1 showing a rotary drive with two sets of balls.

In accordance with one particular aspect of the invention more particularly seen in FIG. 2, there is a central space 30 at the periphery of the rotary drive 20 to separate two sets of balls on either side of this central space. This arrangement prevents balls circulating in the meshing area and therefore being subjected to high stresses. This central space may be used to integrate a reserve of grease, for example by incorporating in it a porous material impregnated with grease.

Figure 3:
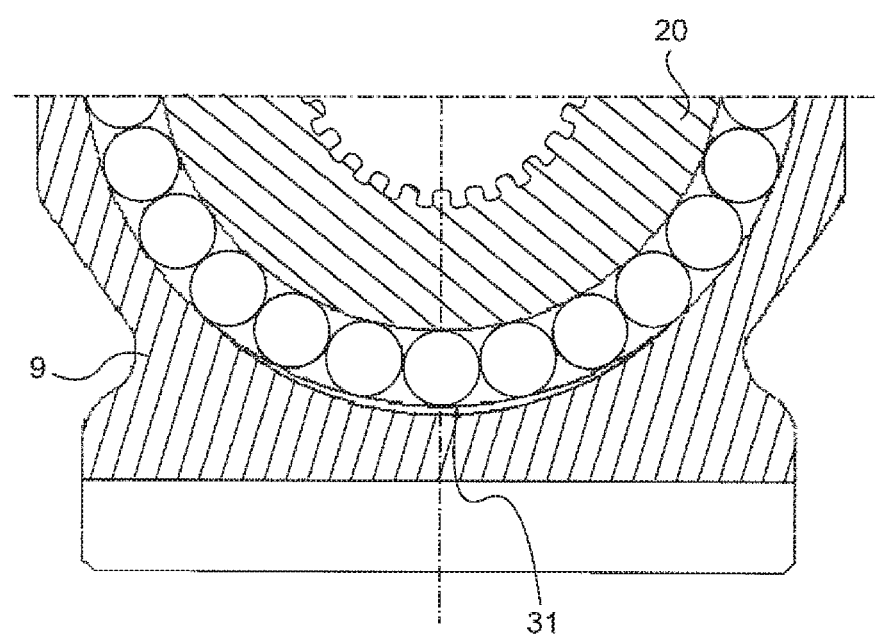
FIG. 3 is a section on a plane passing through the sliding axis of the sliding rod of a rotary drive, with a deepened ball race.

In accordance with a variant embodiment shown in FIG. 3, the ball race in the rack tube 9 includes a portion 31 facing the meshing area that is made deeper than the rest of the ball race. The stress that is exerted on the rack during meshing, and which therefore tends to compress it locally, can therefore be absorbed without generating excess stresses in the balls passing through the meshing area.

The invention is not limited to what has just been described but to the contrary encompasses any variant within the scope of the claims. In particular, although here the rotary drive is driven in rotation by a remotely located electric motor extending around one of the half-cylinders by means of a shaft with a splined end, other remotely located drive means may be used, such as a hydraulic drive. The torque may be transmitted by a shaft as shown, but equally via a flexible drive. A local electric drive may also be used, for example integrated directly into the elongate supports. A reducer may be inserted.

Although here the rotary drive is positioned by two elongate supports, a single elongate support may be used, passing through the interior of the rotary drive, and would then have to carry the two ball-joint type axial thrust bearings.

Although here the rotating member of the orientation control is a tube rotatably mounted inside the strut assembly of the undercarriage leg, the rotary member may equally be a collar mounted to rotate around the strut assembly of the undercarriage leg.

The invention claimed is:

1. An undercarriage leg including a strut assembly in which a rod carrying in its lower portion one or more wheels is mounted to slide and free to turn about a pivot axis (Z), the undercarriage leg including an orientation control for selectively orienting the wheel or wheels by causing the sliding rod to pivot, the orientation control including a rotating member rotatably mounted on the strut assembly that includes a toothed sector forming a pinion and is rotationally coupled to the sliding rod, as well as a rack mounted to slide on the strut assembly along a sliding axis perpendicular to the pivot axis to mesh with the pinion in a meshing area, the rack being moved by drive means, wherein the drive means includes a rotary drive inside the rack adapted to turn about the sliding axis and to cooperate via a helicoidal coupling with the rack, the rotary drive being immobilized axially by two opposite axial thrust bearings allowing angular tilting of the rotary drive, the thrust bearings being carried by at least one elongate support inside the rack having a proximal end fixed to an end of a cylinder in which the rack slides.

2. The undercarriage leg according to claim 1, wherein the axial thrust bearings include spherical bearing surfaces cooperating with the rotary drive to allow ball-joint type operation thereof.

3. The undercarriage leg according to claim 1, wherein the axial thrust bearings are associated with rolling member thrust bearings.

4. The undercarriage leg according to claim 1, wherein the axial thrust bearings are carried by respective elongate supports on either side of the rotary drive.

5. The undercarriage leg according to claim 1, wherein the drive means include a remotely located motor that drives the rotary drive in rotation by means of a shaft inside the rack.

6. The undercarriage leg according to claim 5, wherein the shaft has a distal end carrying convex splines that cooperate with homologous splines of an orifice in a central wall of the rotary drive.

7. The undercarriage leg according to claim 5, wherein the remotely located motor is an electric motor around the cylinder in which the rack slides.

8. The undercarriage leg according to claim 1, wherein the helicoidal coupling between the rotary drive and the rack is a recirculating ball screw type coupling.

9. The undercarriage leg according to claim 8, wherein the rotary drive includes a central space at its periphery that separates two distinct sets of balls on either side of the central space.

10. The undercarriage leg according to claim 8, wherein the rack includes a ball race including a deepened portion facing the meshing area.

\* \* \* \* \*